United States Patent
Nakamura

(10) Patent No.: US 9,528,591 B2
(45) Date of Patent: Dec. 27, 2016

(54) VEHICLE TRANSMISSION

(71) Applicant: Kawasaki Jukogyo Kabushiki Kaisha, Hyogo (JP)

(72) Inventor: Yasushi Nakamura, Osaka (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 141 days.

(21) Appl. No.: 14/630,388

(22) Filed: Feb. 24, 2015

(65) Prior Publication Data

US 2015/0240933 A1  Aug. 27, 2015

(30) Foreign Application Priority Data

Feb. 27, 2014  (JP) ................. 2014-036388

(51) Int. Cl.
  *F16H 3/08*  (2006.01)
  *F16H 57/00*  (2012.01)
  *F16H 3/089*  (2006.01)

(52) U.S. Cl.
  CPC .......... *F16H 57/0031* (2013.01); *F16H 3/089* (2013.01); *F16H 2200/0047* (2013.01); *Y10T 74/19219* (2015.01)

(58) Field of Classification Search
  CPC .................. F16H 57/0493; F16H 57/0431
  USPC ......................................................... 74/325
  See application file for complete search history.

(56) References Cited

U.S. PATENT DOCUMENTS

| 4,034,456 A * | 7/1977 | Bowers ................... B21F 15/00 29/520 |
| 6,367,966 B1 * | 4/2002 | Hara ........................ G04B 1/10 368/140 |
| 8,850,913 B2 * | 10/2014 | Nikolaizig ................ F16H 3/08 74/325 |
| 8,984,976 B2 * | 3/2015 | Cavallino ................. F16H 3/10 74/325 |
| 9,003,904 B2 * | 4/2015 | Wang ....................... F16D 23/12 74/325 |

FOREIGN PATENT DOCUMENTS

JP  2010-084917  4/2010

* cited by examiner

*Primary Examiner* — Ha D Ho

(57) ABSTRACT

A vehicle transmission includes an input shaft and an input side fifth speed gear that is relatively rotatably mounted on the input shaft. Axial one end face of the fifth speed gear is so disposed as to neighbor a stepped face between a large and reduced diameter portions in the input shaft. At a root portion continued to the stepped face in an outer peripheral surface of the input shaft, an escapement is formed so as to be recessed radially outwardly. A chamfered portion is formed in an angled portion at one end on the stepped face side in the inner peripheral surface of the fifth speed gear. The axial distance (b) from one end of the fifth speed gear to a terminating end of the chamfered portion is chosen to be greater than the axial distance (a) from the stepped face to the terminating end of the escapement.

5 Claims, 3 Drawing Sheets

PRIOR ART

VEHICLE TRANSMISSION

CROSS REFERENCE TO THE RELATED APPLICATION

This application is based on and claims Convention priority to Japanese patent application No. 2014-036388, filed Feb. 27, 2014, the entire disclosure of which is herein incorporated by reference as a part of this application.

BACKGROUND OF THE INVENTION

Field of the Invention

The present invention relates to a vehicle transmission equipped with a rotary shaft and a plurality of speed change gears.

Description of Related Art

As a transmission used in an automotive vehicle such as a motorcycle, a constant mesh type multi-stage speed changing device is available such as disclosed in, for example, the Japanese Laid-open Patent Publication No. 2010-084917. Since a rotary shaft employed in such a speed changing device is formed integrally with speed change gears, spline serrations and others, the outer diameter of the rotary shaft is not constant and a large diameter portion and a reduced diameter portion are formed in the rotary shaft. Also, a plurality of speed change gears includes a fixed gear formed integrally with the rotary shaft, an engagement gear splined to the rotary shaft and a rotary gear mounted relatively rotatably on the rotary shaft.

In such speed changing device, in the event that the rotary gear is provided in the vicinity of the large diameter portion, when the rotary shaft rotates and the rotary gear run idle, an edge of an escapement (other end of the escapement) formed laterally of the rotary gear in an outer periphery of the rotary shaft strongly contacts an inner peripheral surface of the rotary gear. Additionally, a lubricant oil at this sliding portion becomes short, and therefore, friction induced sounds are apt to be generated between the rotary shaft and the rotary gear.

In order to suppress the friction induced sounds, the inventor of the present invention has made use of a tonic groove in the inner peripheral surface of the rotary gear to thereby increase the amount of lubricant at the sliding portion, which use has resulted in the effect of suppressing the generation of the friction induced sounds. This measure has, however, been found bringing about the reduction in contact surface area between the rotary gear and the rotary shaft and, therefore, the contact pressure poses a problem. It is also known that interposition of a tubular collar between the rotary gear and the rotary shaft to avoid the contact of the edge of the escapement with the inner peripheral surface of the rotary gear is effective to suppress the friction induced sounds. However, this countermeasure brings about an increase of the inner diameter of the rotary gear by a quantity corresponding to the interposition of the collar. Therefore, particularly where a dog transmission, for example, is used, a dog tooth is apt to be displaced radially outwardly, and accordingly, alteration of the transmission in its entirety may become required.

SUMMARY OF THE INVENTION

In view of the foregoing, the present invention is intended to provide a vehicle transmission capable of suppressing generation of abnormal sounds occurring during the idle run of the rotary gear.

In order to accomplish the foregoing object, the present invention provides a vehicle transmission which includes a rotary shaft and a rotary gear relatively rotatably mounted on the rotary shaft, in which the rotary shaft has a large diameter portion and a reduced diameter portion, and the rotary gear has an axial end face disposed to neighbor a stepped face in the rotary shaft, which lies between the large diameter portion and the reduced diameter portion so as to face in an axial direction. In the vehicle transmission, an escapement is formed at a root portion continued to the stepped face in an outer peripheral surface of the rotary shaft, and the escapement is radially inwardly recessed, and a chamfered portion is formed in an angled portion at one end on the stepped face side in an inner peripheral surface of the rotary gear. In this vehicle transmission, the axial distance b from one end of the rotary gear to a terminating end of the chamfered portion is chosen to be greater than an axial distance a from the stepped face to a terminating end of the escapement. It is to be noted that the term "terminating end" used hereinabove and hereinafter is to be understood as meaning an end portion spaced away from the stepped face.

If the distance a as defined above is greater than the distance b (a>b), an edge of a contact portion between the rotary shaft and the rotary gear is defined by the terminating end of the escapement of the rotary shaft. In other word, the edge of the contact portion has been formed in the rotary shaft which is a rotatable component. Since the rotary shaft performs a transmission of the power (torque) while being rotated, deformation occurs at all times. For this reason, since the contact extent (contact pressure) of the contact portion becomes large, it will be adversely affected by the situation of the lubricant oil and the abnormal sounds resulting from shortage of the lubricant oil is apt to occur.

According to the present invention, however, the edge of the contact portion between the rotary shaft and the rotary gear is defined by the terminating end of the chamfered portion of the rotary gear. This rotary gear, when under a freely idling condition, does not perform the transmission of the power (torque) and, therefore, no deformation occurs. As discussed above, the contact portion with the rotary gear including the terminating end is free from any deformation and exhibits the extent (pressure) of contact that is small, and therefore, it is hardly affected by the situation of the lubricant.

Since as discussed above the contact of the terminating end (edge) of the escapement of the rotary shaft with the inner peripheral surface of the rotary gear is avoided, the generation of the friction induced sounds occurring between the rotary shaft and the rotary gear can be suppressed. Also, since the distance a is chosen to be smaller than distance b (a<b), the lubricant oil in the space between the escapement of the rotary shaft and the chamfered portion of the rotary gear can be purged towards the chamfered portion by the effect of a centrifugal force. Such lubricant oil purged is smoothly guided along the inner peripheral surface of the chamfered portion and over the terminating end (edge) of the escapement, towards a sliding portion between the outer peripheral surface of the rotary shaft and the inner peripheral surface of the rotary gear. As a result, the generation of the friction induced sounds between the rotary shaft and the rotary gear can be further suppressed.

In a preferred embodiment of the present invention, an angle of inclination of the chamfered portion relative to a rotary axis of the rotary shaft may be chosen to be within the range of 6.8 to 11.0°. If the angle of inclination is not greater than 6.8°, an effect of the provision of the chamfered portion to suppress the contact with the root portion is small. On the other hand, if the angle of inclination exceeds the upper limit of 11°, it will become difficult to effectively guide the lubricant oil.

The present invention may be applied to a vehicle transmission of a dogging type, in which, for example, an end face of the other end of the rotary gear opposite to such one end thereof is formed with a recess for engagement with a dog that is axially movably meshed with the rotary shaft. According to the present invention, since the axial distance a from the stepped face to the terminating end of the escapement and the axial distance b from the end of the rotary gear to the terminating end of the chamfered portion are changed, the inner diameter of the rotary gear does not alter. Accordingly, the present invention can be easily applied to the conventional dog transmission.

In another preferred embodiment of the present invention, the vehicle transmission of the present invention may also include a fixed gear formed integrally with the rotary shaft, in which case the stepped face is defined by one end face of the fixed gear, which faces the rotary gear. According to this feature, since the fixed gear forms the large diameter portion of the rotary shaft, the present invention can be easily applied to the conventional dog transmission.

In a further preferred embodiment of the present invention, the large diameter portion and the reduced diameter portion, both in the rotary shaft, may be formed integrally with the rotary shaft. According to this feature, the large diameter portion is, for example, a fixed gear formed integrally with the rotary shaft and having spline serrations, whereas the reduced diameter portion is a shaft portion of the rotary shaft. Accordingly, the present invention can be easily applied to the conventional vehicle transmission.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
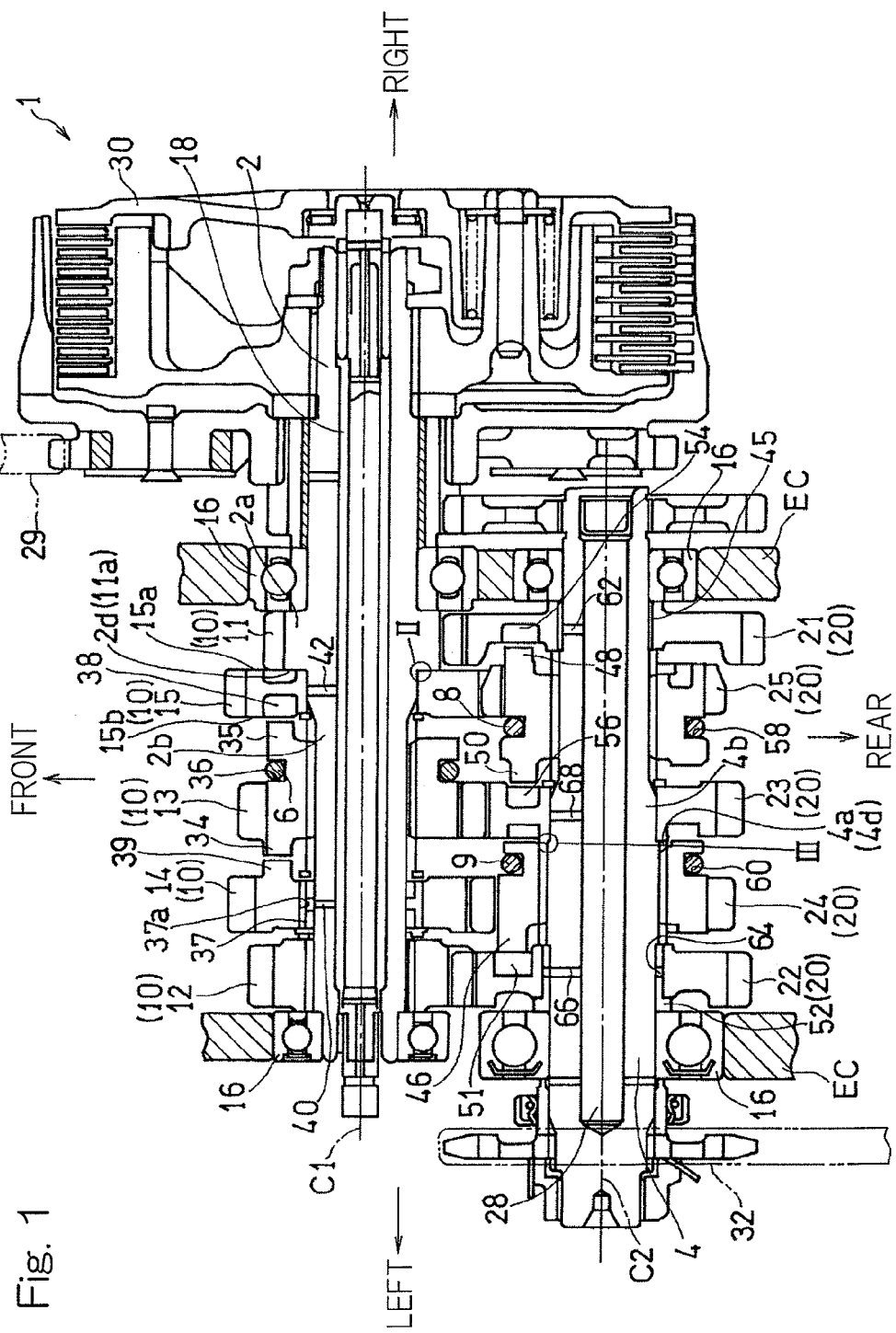
FIG. 1 is a horizontal sectional view showing a vehicle transmission designed in accordance with a preferred embodiment of the present invention.

Hereinafter, a preferred embodiment of the present invention will be described in detail with particular reference to the accompanying drawings. In particular, FIG. 1 illustrates a horizontal sectional view showing the vehicle transmission designed in accordance with the preferred embodiment of the present invention. The vehicle transmission 1 employed in describing the preferred embodiment is accommodated with an engine casing EC of a motorcycle combustion engine.

The vehicle transmission 1 includes an input shaft 2, so disposed as to extend parallel to a crankshaft (not shown) of the combustion engine, and an output shaft 4 paralleled rearwardly of the input shaft 2. Those shafts 2 and 4 have an input side speed change gear train 10 and an output side speed change gear train 20 mounted thereon, respectively. Also, an input side shift fork 6 is arranged at the input shaft 2, and output side first and second shift forks 8 and 9 are arranged at the output shaft 4.

The input shaft 2 and the output shaft 4 altogether form a rotary shaft of the transmission 1 and are rotatably supported within the engine casing EC through a plurality of bearings 16. Each of the shafts 2 and 4 has a large diameter portion 2a or 4a, which has a large outer diameter, and a reduced diameter portion 2b or 4b which has a small outer diameter. The details of each of the large diameter portions 2a and 4a and the reduced diameter portions 2b and 4b will be described later. Each of the shafts 2 and 4 is in the form of a hollow shaft of a structure having a hollow defined therein for the flow a lubricant oil therethrough.

The input shaft 2 has any known clutch 30 mounted thereon for selectively coupling and decoupling a power transmission path, and a rotational power is transmitted from a clutch gear 29, which is provided on the crankshaft (not shown) of the combustion engine, to the input shaft 2 through the clutch 30. The rotational power of the input shaft 2 is transmitted to the output shaft 4 through the respective speed change gear trains 10 and 20. On the other hand, the rotational power of the output shaft 4 is transmitted to a rear wheel (not shown) through a power transmitting unit 32 such as, for example, a chain, belt or drive shaft.

The transmission 1 employed in the practice of the preferred embodiment is a five-speed changer of a constant mesh type, in which the input side speed change gear train 10 includes an input side first (low) speed gear 11, an input side second speed gear 12, an input side third speed gear 13, an input side fourth speed gear 14 and an input side fifth speed gear 15 whereas the output side speed change gear train 20 includes an output side first (low) speed gear 21, an output side second speed gear 22, an output side third speed gear 23, an output side fourth speed gear 24 and an output side fifth speed gear 25. The input side first to fifth speed gears 11 to 15 are engageable with the output side first to fifth speed gears 21 to 25, respectively.

The input side first speed gear 11 is disposed at an axially oriented first end (in the illustrated example, a right side end) in the input side speed change gear train 10 provided on the input shaft 2. The input side second speed gear 12 is disposed at an axially oriented second end (in the illustrated example, a left side end and opposite to the above described first end). The input side third speed gear 13 is disposed at an intermediate location. The input side fourth speed gear 14 is disposed between the input side second speed gear 12 and the input side third speed gear 13. The input side fifth speed gear 15 is disposed between the input side first speed gear 11 and the input side third speed gear 13.

The input side first speed gear 11 is formed integrally with the input shaft 2. In other words, the input side first speed gear 11 is a fixed gear that is integrally formed with the input shaft 2 for rotation together therewith. This input side fixed gear 11 has its rough contour formed integrally with the input shaft 2 by means of a forging technique and is subsequently shaped by means of a cutting process, a grinding process and a polishing process.

The input side first speed gear 11, which is the fixed gear, forms the large diameter portion 2a of the input shaft 2 and the remaining portion of the input shaft 2 forms the reduced diameter portion 2b. Between the large diameter portion 2a and reduced diameter portion 2b of the input shaft 2, an axially oriented stepped face 2d is formed. In the embodiment now under discussion, the input side first speed gear 11, which is the fixed gear, has a first end face (right side end face) thereof facing the bearings 16 and the second end face (a left end face) 11a thereof, which is opposite to the first end face and confronts a rotary gear 15 as will be described later. This second end face 11a forms the stepped face 2d referred to above.

The input side second speed gear 12 and the input side third speed gear 13 are splined to the input shaft 2 and are relatively non-rotatably mounted on the input shaft 2. Left and right side end portion of the input side third speed gear 13 are formed integrally with first and second dogs 34 and 35 for connecting purpose. The junction between the input side third speed gear 13 and the second dog 35 is formed with an annular groove 36 in which the input side shift fork 6 is engageable. In other words, the third speed gear 13 is movable in the axial direction upon a fork maneuver for moving the input side shift fork 6 in a direction parallel to a longitudinal axis or rotary axis C1 of the input shaft 2.

The input side fourth speed gear 14 is relatively rotatably mounted on the input shaft 2 through a first slide bearing 37. A right side end portion of the input side fourth speed gear 14 is formed with a third dog 39 for dog connection. An axially intermediate portion of the first slide bearing 37 is formed with a first oil groove of a toric shape. At an axial position of the input shaft 2 which corresponds to the first oil groove 37a, a first oil passage 40 is formed so as to extend radially. This first oil passage 40 serves to connect an annular introducing passage 18 inside the input shaft 2 with the first oil groove 37a. When the input shaft 2 rotates, a lubricant oil within the introducing passage 18 is introduced via the first oil passage 40 into the first oil groove 37a by the effect of the centrifugal force so developed, thus lubricating a sliding portion of the first slide bearing 37.

The input side fifth speed gear 15 is a rotary gear that is relatively rotatably mounted on the input shaft 2. This input side fifth speed gear 15 has an axially oriented first end face (a right side end face) 15a so disposed as to neighbor the stepped face 2d of the input shaft 2. The input side fifth speed gear 15 also has a second end face (left side end face) 15b opposite to the above described first end face 15a, in which a first recess 38 is formed for engagement with the second dog 35.

At an axial position of the input shaft 2 corresponding to an axially intermediate portion of the input side fifth speed gear 15, a second oil passage 42 is so formed as to extend in a radial direction. When the input shaft 2 rotates, the lubricant oil inside the introducing passage 18 is introduced into the second oil passage 40 to lubricate a sliding interface between the inner peripheral surface of the input side fifth speed gear 15, which is a rotary gear, and the outer peripheral surface of the input shaft 2.

When the input side shift fork 6, which is interposed between the input side three speed gear 13 and the input side fifth speed gear 15, is shifted leftwards to move the input side three speed gear 13, the first dog 34 and the third dog 39 are engaged with each other. Accordingly, the input side third speed gear 13 and the input side fourth speed gear 14 are connected together. Also, when the input side shift fork 6 is shifted rightwards to move the input side third speed gear 13, the second dog 35 is engaged in the first recess 38. Accordingly, the input side third speed gear 13 and the input side first speed gear 11 are connected together. When the input side shift fork 6 is held at a neutral position, a free condition is established in which none of the speed gears 11 to 15 is connected.

Even in the case of the respective output side speed change gear train 20, the output side first to fifth speed gears 21 to 25 are disposed at respective positions corresponding to the input side speed change gears 11 to 15 of the input side speed change gear train 10 as hereinabove described and are engaged with the corresponding input side speed change gears 11 to 15. The output side fourth speed gear 24 and the output side fifth speed gear 25 are relatively non-rotatably splined to the output shaft 4. The output side first speed gear 21 is relatively rotatably mounted on the output shaft 4 through a second slide bearing 45. The output side second speed gear 22 is relatively rotatably mounted on the output shaft 4 through a cylindrical collar 52 in a fashion inhibited from axial movement. The output side speed gear 23 is relatively rotatably mounted on the output shaft 4. In other words, the output side first to third speed gears 21 to 23 are rotary gears.

A mounting portion of the output shaft 4, where the output side fourth speed gear 24 is mounted, is rendered to be large in diameter as compared with the diameter of the remaining portion of the output shaft 4. In other words, that mounting portion of the output shaft 4, where the output side fourth speed gear 24 is mounted, forms a large diameter portion 4a, and an outer periphery of this large diameter portion 4a is formed with spline serrations with which the output side fourth speed gear 24 are engageable. The remaining portion of the output shaft 4 other than the mounting portion thereof forms a reduced diameter portion 4b. Axially oriented opposite end faces of the large diameter portion 4a form a stepped face 4d.

At a position of the output shaft 4, which corresponds to an axially intermediate portion of the second slide bearing 45, a third oil passage 62 is formed so as to extend radially. When the output shaft 4 rotates, the lubricant oil within a hollow 28 is introduced into the third oil passage 62 by the effect of the centrifugal force so developed and a sliding portion of the second slide bearing 45 is therefore lubricated.

At an axially oriented intermediate portion of the collar 52 of the output side second speed gear 22, a fourth oil passage 64 in the form of a throughhole is formed. At an axial position of the output shaft 4, which corresponds to the fourth oil passage 64, a radially extending fifth oil passage 66 is formed. This fifth oil passage 66 connects the hollow 28 of the output shaft 4 with the fourth oil passage 64. When the output shaft 4 rotates, the lubricant oil within the hollow 28 is introduced into the fourth oil passage 64 through the fifth oil passage 66 by the effect of the centrifugal force so developed so that a sliding portion between the output side second speed gear 22 and the collar 52 and a sliding portion between the collar 52 and the output shaft 4 are lubricated.

At a position of the output shaft 4, which corresponds to an axially intermediate portion of the output side third speed gear 23, a radially extending sixth oil passage 68 is formed. When the output shaft 4 rotates, the lubricant oil within the hollow 28 is introduced into the sixth oil passage 68 by the effect of the centrifugal force so developed, and a sliding interface between the inner peripheral surface of the output side third speed gear 23, which is a rotary gear, and the outer peripheral surface of the output shaft 4 is therefore lubricated.

The output side fourth speed gear 24 has an axially oriented right side end (one end) positioned proximate to the output side second shift fork 9 and a left side end (other end) provided with a fourth dog 46 for engagement with the output side second speed gear 22. The output side fifth speed gear 25 has its axially oriented opposite ends provided with a fifth dog 48 for engagement with the output side first speed gear 21 and a sixth dog 50 for engagement with the output side third speed gear 23. The output side second speed gear 22 has a second recess 51 in which the fourth dog 46 is engageable. The output side first speed gear 21 and the output side third speed gear 23 are respectively formed with third and fourth recesses 54 and 56 engageable with the fifth and sixth dogs 48 and 50.

The output side first shift fork 8 is disposed between the third dog 48 and the fourth dog 50 of the output side fifth speed gear 25 and is engaged in an annular groove 58 formed in the output side fifth speed gear 25. The output side second shift fork 9 is disposed between the output side fourth speed gear 24 and the output side third speed gear 23 and is engaged in an annular groove 60 formed in the output side fourth speed gear 24. In other words, the output side fourth speed gear 24 and the output side fifth speed gear 25 is capable of being moved in a direction along the longitudinal axis or rotary axis C2 of the output shaft 4 by means of a fork maneuver.

When the output side first shift fork 8 is moved rightwards, a dog connection takes place between the output side fifth speed gear 25 and the output side first speed gear 21. When the output side first shift fork 8 is shifted leftwards, a dog connection takes place between the output side fifth speed gear 25 and the output side third speed gear 23. When the output side first shift fork 8 is held in a neutral position, the output side fifth speed gear 25 is in a position connected with none of the speed gears. Also, when the output side second shift fork 9 is shifted leftwards, a dog connection takes place between the output side fourth speed gear 24 and the output side second speed gear 22. When the second shift fork 9 is held in a neutral position, the output side fourth speed gear 24 is held in a free condition in which it is connected with none of the gears.

In the event that the fifth speed is selected, the input side shift fork 6 is moved rightwards to allow the input side third speed gear 13 and the input side fifth speed gear 15 to be connected with each other. The output side first and second shift forks 8 and 9 are held in the respective neutral positions. Accordingly, via the input side fifth speed gear 15 meshed with the input side third speed gear 13 splined to the input shaft 2 and the output side fifth speed gear 25 splined to the output shaft 4, a rotational power is transmitted from the input shaft 2 to the output shaft 4.

Under this condition the input side fifth speed gear 15 rotates together with the input shaft 2, and therefore, no relative rotation occurs between the input side fifth speed gear 15 and the input side first speed gear 11 neighboring thereto. In the event that any other speed than the fifth speed is selected, since the second dog 35 disengages from the first recess 38, the input side fifth speed gear 15 is brought into a free condition, in which no driving force is transmitted, and does therefore run idle.

The output side third speed gear 23, also, rotates together with the output shaft 4 under a condition, in which the third speed is selected, and no relative rotation occurs between it and the neighboring fixed gear 24. However, in the event that any other speed than the third speed is selected, the free condition, in which no driving force is transmitted, is established accompanying an idle run of the output side third speed gear 23.

Figure 2:
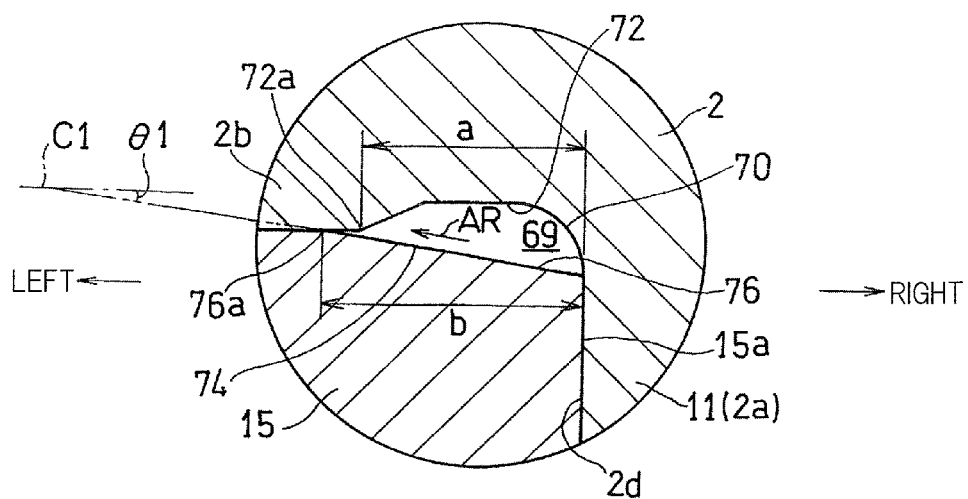
FIG. 2 is a fragmentary sectional view showing, on an enlarged scale, a portion indicated by II in FIG. 1.

FIG. 2 is a diagram showing, on an enlarged scale, a portion indicated by II in FIG. 1. A root portion 70, which is continued to the stepped face 2d in the outer peripheral surface of the input shaft 2, is formed with an escapement 72 that is radially inwardly recessed. Although, as described above, the input shaft 2 has its rough contour formed therein by means of the forging technique and is subsequently shaped by means of a cutting process, a grinding process or a polishing process, the escapement 72 is formed by means of a mechanical processing or a forging technique, which takes place in the preceding stage of the polishing process, in order to facilitate the polishing process of a shaft portion.

On the other hand, an angled portion 74 at one end of a stepped face side (right side) in the inner peripheral surface of the input side fifth speed gear 15 is formed with a chamfered portion 76. The escapement 72 cooperated with the chamfered portion 76 to define a lubricant oil reserving space 69. The chamfered portion 76 is provided for suppressing a contact with the outer peripheral surface of the input shaft 2.

The escapement 72 is so formed as to lie from one end, which aligns the stepped face 2d in the outer peripheral surface of the input shaft 2, to the opposite end spaced axially away therefrom. The chamfered portion 76 is so formed as to lie from the first end face 15a of the input side fifth speed gear 15 to the other end that is axially leftwardly spaced therefrom.

In the embodiment now under discussion, the axial distance b from the first end face 15a of the input side fifth speed gear 15 to a terminating end (left end) of the chamfered portion 76 is so chosen as to be greater than the axial distance a from the stepped face 2d to a terminating end (left end) 72a of the escapement portion 72. Also, the angle θ1 of inclination of the chamfered portion 76 relative to the longitudinal axis or rotary axis C1 of the rotary shaft 2 is so chosen as to be within the range of 6.8 to 11.0°. In the practice of the illustrated embodiment about 10° is chosen for that angle θ1 of inclination.

Figure 3:
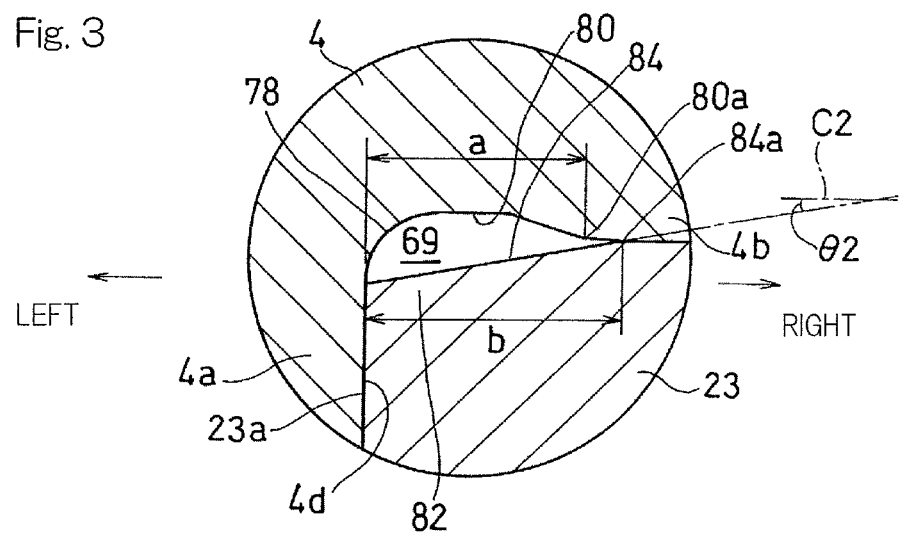
FIG. 3 is a fragmentary sectional view showing, on an enlarged scale, a portion indicated by III in FIG. 1.

FIG. 3 is a diagram showing, on an enlarged scale, a portion indicated by III in FIG. 1. The root portion 78 continued to the stepped face 4d in the outer peripheral surface of the output shaft 4 is formed with an escapement 80 that is radially inwardly recessed, in a manner similar to that formed in the input shaft 2 described above. An angled portion 82 at one end of the stepped face side (left side) in the inner peripheral surface of the output side third speed gear 23, which is the rotatable gear, is formed with a chamfered portion 84. The escapement 80 cooperates with the chamfered portion 84 to define the lubricant reserving space 69.

Even in FIG. 3, the axial distance b from a left end face 23a of the output side third speed gear 23 to a terminating end (left end) of the chamfered portion 84 is so chosen as to be greater than the axial distance a from the stepped face 4d to a terminating end (right end) 80a of the escapement portion 80. The angle θ2 of inclination of the chamfered portion 84 relative to the longitudinal axis or rotary axis C2 of the rotary shaft 4, too, is so chosen as to be within the range of 6.8 to 11.0°. In the practice of the illustrated embodiment the angle θ2 of inclination is chosen about 10°.

Figure 4:
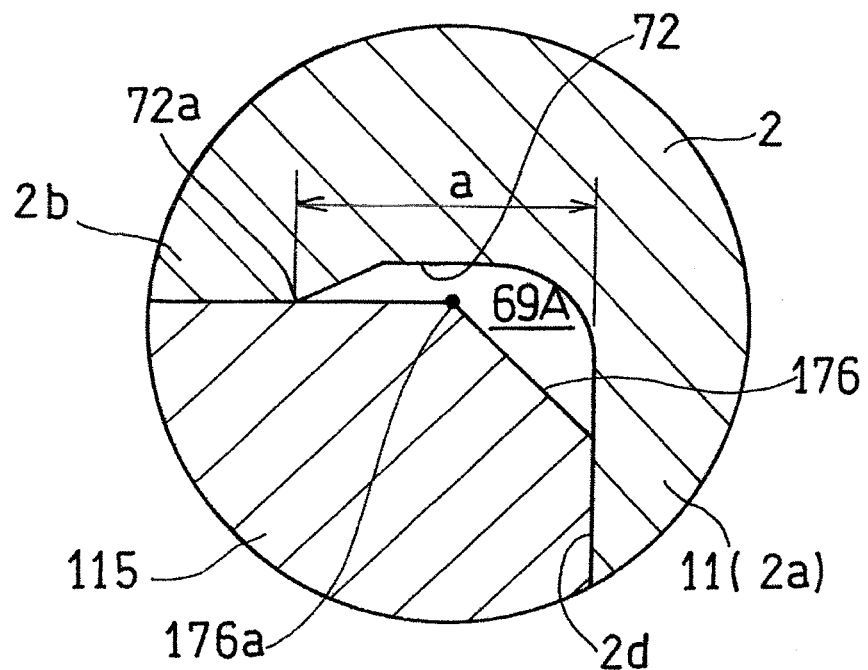
FIG. 4 is a fragmentary sectional view showing, on an enlarged scale, an important portion of the conventional vehicle transmission.

FIG. 4 illustrates an enlarged sectional view showing a portion of the conventional transmission, which corresponds to FIG. 2. The transmission shown in FIG. 4 differs from the transmission 1 shown in FIG. 2, as far as the shape of the chamfered portion 176 is concerned, noting that the remaining structure remains the same. More specifically, in the transmission shown in FIG. 4, the terminating end (left end) of the chamfered portion 176 lies at a location rightwards (on the stepped face side) of the terminating end (left end) 72a of the escapement 72. In other words, the axial distance b from one end face 115a of the input side fifth speed gear 115 to the terminating end (left end) of the chamfered portion 176 is smaller than the axial distance a from the stepped face 2d to the terminating end (left end) 72a of the escapement 72.

Also, although not shown, even regarding the output side third speed gear 23, it is of the same structure as that in the conventional input side.

In the transmission shown in and described with reference to FIG. 4, as hereinabove discussed, when each of the shafts 2 and 4 rotates, the edge 72a of the escapement 72 strongly contacts the inner peripheral surface of the input side fifth speed gear 115. At the same time, the lubricating condition at this contact portion becomes worse, and therefore, friction induced sounds are generated. In other words, when the input shaft 2 rotates, the edge 72a of the escapement 72 strongly contacts the inner peripheral surface of the input side fifth speed gear 115. At the same time, since the escapement 176 is not extended to the edge 72a of the escapement 72, the lubricant oil between the input side fifth speed gear 115 and the reduced diameter portion 2b of the input shaft 2, which oil is present on the other side (right side) of the edge 72a, is pooled radially outwardly of the chamfered portion 176, and the lubricant oil is not sufficiently supplied to the sliding portion. Therefore, sounds induced by friction between the input shaft 2 and the input side fifth speed gear 115 is apt to be generated.

No friction induced sound occurs at the output side first speed gear 21 and the output side second speed gear 22. The reason therefor is that the output side first speed gear 21 and the output side second speed gear 22 are mounted on the output shaft 4 through the second slide bearing 45 and the collar 52, respectively and this point is different in condition from the input side fifth gear 15 and the output third speed gear 23.

In the construction described in connection with the foregoing preferred embodiment, as shown in FIG. 2, the axial distance b from the first end face (one end) 15a of the input side fifth speed gear 15 to the terminating end 76a of the chamfered portion 76 is chosen to be greater than the axial distance a from the stepped face 2d, to the terminating end (edge) 72a of the escapement 72. Accordingly, an undesirable contact of the edge 72a of the escapement 72 with the inner peripheral surface of the input side fifth speed gear 15 is avoided and, therefore, generation of the friction induced sounds between the input shaft 2 and the input side fifth speed gear 15 is suppressed.

In addition, in view of the axial distance b being greater than the axial distance a (a<b) as shown by the arrow AR in FIG. 2, the lubricant oil within the lubricant oil reserving space 69 is purged towards the chamfered portion 76 by the effect of the centrifugal force and is thus guided smoothly along the inner peripheral surface of the chamfered portion 76 towards the sliding interface between the outer peripheral surface of the input shaft 2 and the inner peripheral surface of the input side fifth speed gear 15. As a result, the generation of the friction induced sounds of the input shaft 2 and the input side fifth speed gear 15 can be further suppressed.

As shown in FIG. 4, the conventional art is such that the edge of the contact portion between the input shaft 2 and the input side fifth speed gear 115 is defined by the terminating end 72a of the escapement 72 in the input shaft 2. In other words, the input shaft 2, which is a rotary component, is formed with the edge of the contact portion. Since the input shaft 2 performs the transmission of the power (torque) while being rotated, deformation occurs at all times. For this reason, the extent of contact (pressure) of the contact portion becomes large, and therefore, it will be adversely affected by the situation of the lubricant oil and the abnormal sounds resulting from shortage of the lubricant oil is apt to occur.

In contrast thereto, according to the foregoing embodiment, as shown in FIG. 2, the edge of the contact portion between the input shaft 2 and the input side fifth speed gear 15 is defined by the terminating end 76a of the chamfered portion 76 of the input side fifth speed gear 15. Since this input side fifth speed gear 15, when under a freely idling condition, does not perform the transmission of the power (torque), no deformation occurs. As discussed above, since the contact portion of the input side fifth speed gear 15, including the terminating end 76a, is free from any deformation and exhibits the extent (pressure) of contact that is small, it is hardly affected by the situation of the lubricant.

The angle θ1 of inclination of the chamfered portion 76 relative to the longitudinal axis C1 of the input shaft 2 is preferably so chosen as to be within the range of 6.8 to 11.0°. If the angle θ1 of inclination is not greater than 6.8°, an effect of the provision of the chamfered portion 76 to suppress the contact with the root portion 70 is small. On the other hand, if the angle θ1 of inclination exceeds the upper limit of 11°, it will become difficult to effectively guide the lubricant oil within the lubricant oil reserving space 69.

The transmission 1 referred to in the description of the preferred embodiment is a dog transmission. The inner diameter of the input side fifth speed gear 15 does not change, since the change has been made only to the axial distance b from the first end face (one end) 15a of the input side fifth speed gear 15 to the terminating end 76a of the chamfered portion 76. Accordingly, the present invention can be easily applied to the conventional dog transmission.

Also, the input side first speed gear 11, which is the fixed gear formed integrally with the input shaft 2, forms the large diameter portion 2a of the input shaft 2, and the second end face 11a thereof forms the stepped face 2d. Accordingly, the present invention can be easily applied to the conventional transmission for use in vehicles.

Yet, the fixed gear, which is formed integrally with the output shaft 4 and has the spline serrations, forms the large diameter portion 4a, and a shaft portion of the output shaft 4 forms the reduced diameter portion 4b. Accordingly, the present invention can be easily applied to the conventional transmission for use in vehicles.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment, reference has been made to the transmission of a type used in the motorcycle, the present invention can be equally applied to any other vehicle than the motorcycle.

Accordingly, such changes and modifications are, unless they depart from the scope of the present invention as delivered from the claims annexed hereto, to be construed as included therein.

REFERENCE NUMERALS

1 ... Vehicle transmission
2 ... Input shaft (Rotary shaft)
4 ... Output shaft (Rotary shaft)
2a, 4a ... Large diameter portion
2b, 4b ... Reduced diameter portion
2d ... Stepped face
6, 8, 9 ... Dog for shifting purpose
11 ... Input side first speed gear (Fixed gear)
15 ... Input side fifth speed gear (Rotary gear)
23 ... Output side third speed gear (Rotary gear)
38 ... First recess
70, 78 ... Root portion
72, 80 ... Escapement
72a, 80a ... Terminating end of escapement
74, 82 ... Angled portion
76, 84 ... Chamfered portion
76a, 84a ... Terminating end of chamfered portion
a ... Axial distance from stepped face to terminating end of escapement
b ... Axial distance from one end of input side fifth speed gear to terminating end of chamfered portion
θ1, θ2 ... Angle of inclination of chamfered portion relative to rotary axis of rotary shaft

What is claimed is:

1. A vehicle transmission which comprises:
a rotary shaft, the rotary shaft also having a large diameter portion and a reduced diameter portion; and
a rotary gear relatively rotatably mounted on the rotary shaft, the rotary gear having an axial end face disposed to neighbor a stepped face in the rotary shaft, which lies between the large diameter portion and the reduced diameter portion so as to face in an axial direction, in which:
an escapement is formed at a root portion continued to the stepped face in an outer peripheral surface of the rotary shaft, which escapement is radially inwardly recessed;
a chamfered portion is formed in an angled portion at one end on the stepped face side in an inner peripheral surface of the rotary gear; and
the axial distance b from one end of the rotary gear to a terminating end of the chamfered portion is chosen to be greater than an axial distance a from the stepped face to a terminating end of the escapement.

2. The vehicle transmission as claimed in claim 1, wherein an angle of inclination of the chamfered portion relative to a rotary axis of the rotary shaft is chosen to be within the range of 6.8 to 11.0°.

3. The vehicle transmission as claimed in claim 1, which is a dog transmission, wherein an end face of the other end of the rotary gear opposite to such one end thereof is formed with a recess for engagement with a dog that is axially movably meshed with the rotary shaft.

4. The vehicle transmission as claimed in claim 1, further comprising a fixed gear formed integrally with the rotary shaft, wherein
the stepped face is defined by one end face of the fixed gear, which faces the rotary gear.

5. The vehicle transmission as claimed in claim 1, wherein the large diameter portion and the reduced diameter portion, both in the rotary shaft, are formed integrally with the rotary shaft.

* * * * *